Feb. 13, 1962 S. H. HERZOG 3,020,710
SEALING MEANS FOR ROCKET NOZZLES
Filed March 29, 1956

INVENTOR.
STEPHEN H. HERZOG
BY
ATTORNEYS

Patented Feb. 13, 1962

3,020,710
SEALING MEANS FOR ROCKET NOZZLES
Stephen H. Herzog, China Lake, Calif., assignor to the United States of America as represented by the Secretary of the Navy
Filed Mar. 29, 1956, Ser. No. 574,933
8 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

The present invention relates to improvements in rockets, and more specifically to improved nozzle sealing means for such rockets.

In rocket motor constructions it is common to seal the propulsion nozzles with closure members to prevent foreign matter from entering the rocket motor section and to seal the rocket motor against moisture, whereby deterioration during storage may be kept to a minimum. Such arrangements are particularly important in rockets in which the propellant is in the form of a solid propellant grain, since the materials used for such propellants are particularly susceptible to deterioration and poor storage characteristics when subjected to the moisture in the atmosphere.

It is therefore common to seal the propulsion nozzles of rockets with closures in the form of inserts or caps. Such closures have, in general, been in the form of thin sheet metal plugs either soldered or force fitted into the nozzles and coated with a suitable plastic sealant. Certain disadvantages are inherent in such constructions, since the metal closures are forcibly expelled rather than consumed when the rocket motor is fired. Such expulsion results in hazards to personnel on ground firing; in possible aircraft damage when air-fired, since the closures are sometimes drawn into the air scoops of the firing aircraft with resultant engine damage; and in the possibility of subsequent rocket launcher malfunctioning by virtue of the lodging of expelled closures in the rocket launching tubes between succeeding rounds. Moreover, in multiple nozzle rockets, the present metallic closure arrangement is such that it is extremely difficult, if not impossible, to achieve such an equality of strength of materials and of joints that the closures of the multiple nozzles will be caused to rupture at the same time. Therefore, with such metallic closures, unequal rupture times of the various nozzles results in deflection of multiple nozzle rockets from the desired line of flight and causes undesirable dispersion characteristics in such rockets.

The obvious solution to such difficulties would appear to be in the utilization of relatively softer and consumable thermoplastic materials in the fabrication of nozzle closures and some efforts have been made in this direction. In general, such attempts have been unsuccessful when applied to rockets subject to wide temperature variations (as in rockets intended to be fired from aircraft at high altitudes) because the coefficients of expansion of such plastic materials is so much different from that of the metal of the rocket nozzles that the closures are stressed to breaking at extreme temperatures.

The present invention is predicated upon the discovery that added strength and material for flexing can be made available in a plastic closure member if the central portion or panel of the closure (transverse to the nozzle) is formed into a thickened button which is connected to the side walls by a portion embodying the thinnest web of the central panel. Moreover, this effect can be procured with even less material if a less thickened central portion is utilized in a domed central panel portion (see FIG. 1 of the drawing). Such constructions, properly bonded to the side walls of the nozzles, may be molded with great precision to control exact and equal rupture time in multiple nozzle constructions, and are obviously adapted to completely overcome or greatly alleviate the personnel and equipment hazards of the metallic constructions since they are softened and consumed (at least in part) by the hot propulsion gases upon firing of rockets in which they are utilized.

An additional advantage which is attained by the use of plastic nozzle closures, as disclosed in this invention, resides in the fact that the plastics of which such closures are made are very good insulating materials. Accordingly, when electrical firing devices are operated by wires extending through the nozzles, as is common in many rocket designs, no special insulating and weather-sealing pass-through is necessary, since the electrical leads may be directly molded into the closure, as will be more fully described hereinafter. This is extremely simpler and more economical than the complex and expensive insulating and weather-sealing arrangements which are necessary to prevent grounding or shorting of the electrical leads when metallic closures are used.

It is, therefore, an object of this invention to provide novel plastic closures for the propulsion nozzles of rockets, such closures being constructed and designed to withstand the flexure stresses set up in extreme temperature conditions.

A further object of this invention is to provide novel plastic closures for the propulsion nozzles of rockets, such closures incorporating electrical lead wires molded directly into the material of the closures and passing therethrough.

A still further object of this invention is to provide thermoplastic nozzle closure means for rockets, such means being adapted for precise design and manufacture to exactly control the rupture stress necessary for fracture and displacement.

Another object of this invention is to porvide novel rocket constructions incorporating plastic nozzle closure means whereby the dangers to personnel, aircraft and rocket launching equipment which are inherent in the use of metallic closure means are obviated.

Still another object of this invention is to provide novel multiple nozzle rocket constructions wherein thermoplastic nozzle closures of identical bursting characteristics are employed whereby diffusion in line of flight due to lack of uniformity in bursting time of nozzle closures is obviated.

Other objects and many of the attendant advantages of this invention will become apparent as the same becomes better understood from the following detailed description, taken in conjunction with the accompanying drawing, in which.

Figure 1:
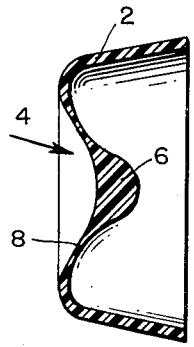
FIG. 1 is a cross-sectional view of a plastic nozzle closure according to this invention, the closure being designed to be positioned externally of a rocket nozzle throat.
Figure 2:
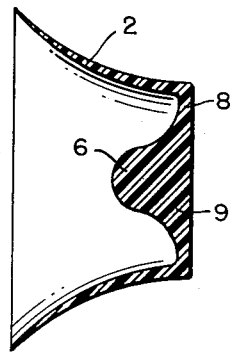
FIG. 2 is a view similar to FIG. 1, showing in section, a modified plastic closure designed to be positioned internally of the rocket nozzle throat.
Figure 3:
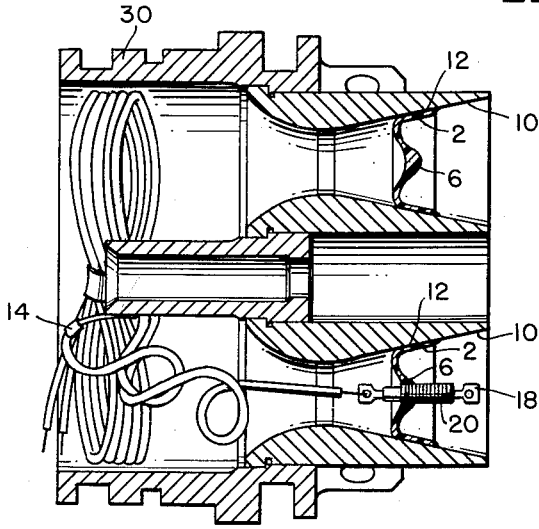
Figure 4:
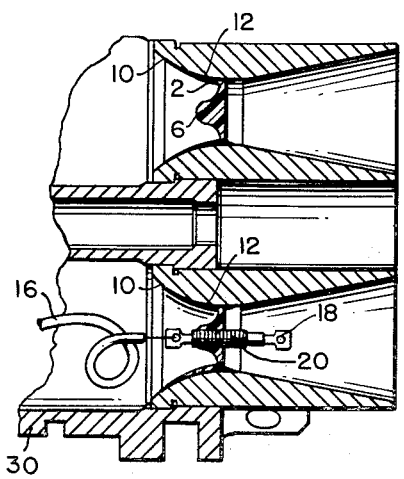

FIG. 3 is a sectional view taken through the center of the after end of a typical multiple nozzle rocket, showing plastic nozzle closures according to FIG. 1 in their assembled position, the closure in the lowermost nozzle of the figure illustrating a further modification encompassed by this invention, namely, the closure of FIG. 1 with electrical pass-through means combined therewith; and FIG. 4 is a view similar to FIG. 3, illustrating the application of the internally positioned nozzle closure of FIG. 2 to a rocket having multiple nozzles and also showing such a closure having an electrical pass through incorporated therein.

Attention is now directed to the drawing, wherein like reference numerals have been appended to like parts throughout. The type of nozzle with which the nozzle closures of this invention are employed is shown in central longitudinal cross section in FIGS. 3 and 4. Such nozzles are of the converging-diverging type (sometimes referred to as a de Laval nozzle) and each comprises three distinct portions which are: (1) a rearward or entrance portion, shown as formed by an inwardly convex curve of revolution, (2) a throat portion of circular cross section disposed rearwardly of the entrance portion, and a diverging exit portion disposed rearwardly of the throat portion, which, as shown, is frusto-conical. FIG. 1 depicts a rocket nozzle closure of a design intended for external insertion into the exit portion of a rocket nozzle, as shown in assembled position in FIG. 3. The closure is made of suitable thermoplastic material and is circular in cross-section. It comprises a skirt portion 2 of frusto-conical configuration which is designed to engage the nozzle wall 10 (as shown in FIG. 3) and which terminates at one of its ends in a transverse closure wall 4. The wall 4 provides the flexure means and the controlled bursting strength means previously mentioned, and comprises an arrangement of concentric portions of different thicknesses extending to the outer periphery of wall 4 which is integral with the skirt portion 2. Thus, the wall 4 comprises a substantially thickened central section or button 6 which is gradually reduced in thickness as it extends radially outwardly to a circular web of desired minimum thickness as represented by the reference numeral 8 as shown in FIG. 1, and then is thickened to the thickness of skirt portion 2 where juncture with the skirt portion is made. The thickened portion or button 6, provides material for permitting a desired degree of flexure where necessary, without rupture occurring, and this characteristic may be augmented by forming the transverse wall in a dome shape, as in FIG. 1.

FIG. 2 illustrates a modification of the FIG. 1 structure described in the preceding paragraph and is designed to be bonded to the entrance portion of a jet nozzle. It comprises a skirt portion 2 of a configuration to be fitted internally into the entrance portion of a jet nozzle (as shown in FIG. 4) and has a transverse wall consisting of a thickened central portion 6 and a burst pressure controlling web of thickness 8' connecting said thickened portion to said skirt portion. As a variation from the domed transverse wall 4 of FIG. 1, added tolerance to flexure is provided in the FIG. 2 modification by the greater thickness of material provided by making the base 9 flat so that a greater thickness or mass of plastic material is present for flexing.

The positioning of the closures of FIGS. 1 and 2 in jet nozzle constructions is illustrated in FIGS. 3 and 4, respectively, as well a further modification of each. In FIGS. 3 and 4 the reference numeral 30 represents an end member adapted to be sealingly inserted in the end of a rocket motor tube (not shown). Such motor tubes contain a combustion chamber and a propellant material adapted to burn therein to generate propulsion gases which are released through exhaust nozzles appropriately secured in the end member to cause propulsion. The end closure and nozzle arrangements shown in FIGS. 3 and 4 are those of typical four nozzle rocket motors of a type in which motor ignition is instituted by electrical means which extend through one of the nozzles. Thus, in each case the ignition circuit comprises a pair of electrical conductors adapted to be connected to an electrically operable igniter means, one of said conductors, 14 being connected at its other end to a metal motor part and the other said conductor, 16, being connected at its other end to an electric terminal 18, passing through a nozzle of the rocket motor and adapted for connection to an electric current supply. Where nozzle closures are used, it is customary to insulatingly attach the terminal 18 to one of said closures, passing through the transverse wall thereof. In the present invention, by virtue of the use of plastic material having high insulating qualities, the difficulties of the prior art in insulating and sealingly attaching a pass-through to a metallic closure, are completely obviated. Thus, as may be seen in FIGS. 3 and 4, terminals 18 are placed in the positions shown, in the course of the formation of the closure and before the thermoplastic materials have hardened. The terminals may be positioned in molds prior to the formation of the closures or may be attached in any other known technique. In order to inhibit loosening of the terminals they may be provided with transverse knurling 20, as shown.

The nozzle section of the four-nozzle arrangements of FIGS. 3 and 4 are assembled by positioning one of the terminal-carrying closures and three normal closures in the four nozzles of the motor and such closures, according to the desired design, may be either of the type shown in FIG. 1 (shown in assembled form in FIG. 3) or of the type shown in FIG. 2 (shown in assembled form in FIG. 4). In either case, it is necessary to effect a bond of the closures to the nozzle walls 10 and for this purpose a suitable plastic bonding material may be employed. This coating of bonding material, designated by the reference numeral 12, is represented by a thickened line of FIGS. 3 and 4, and the coating may be extended aft to the closure to form an additional weather-seal, in the form of a fillet, if so desired.

In the use of thermoplastic closure sealing means of the nature herein disclosed, the firing of the rocket motor by ignition of the gas producing combustible material of the motor (not shown) causes the generation of gases and the creation of gas pressure in the combustion chamber forward of the seals. At predetermined gas pressure, determinable by the specific nature of the plastic material and by the thickness 8 of the bursting web of the closure, the transverse wall 4 of the closure member (or members) is fractured and the comparatively small button portion thereof is blown out. Subsequently, the remaining portions of the closure, including the skirt portion 2, is peeled back by the hot gases and is burned off the nozzle wall. It should be noted that the button portions 6 are much smaller than the full dished metallic cap blown back upon firing of rockets employing metallic closures. Moreover, the materials of which closures are intended to be made, according to this invention, are generally thermoplastic. Accordingly, the hot exhaust gases tend to soften or entirely consume the closure material so that the danger to personnel and equipment is minimized. If a remnant should, nevertheless, be picked up by the air scoop of a jet aircraft, the jet engine or the turbine blades thereof are not liable to injury, as with metal discs, since the plastic material is so softened to a harmless state at engine (turbine) temperatures.

In plural nozzle applications, the present invention makes it possible to easily fabricate closure seals with substantially exact bursting pressure characteristics since many known molding techniques are capable of consistently and exactly duplicating the thickness of the web 8 in the closures. Thus the dispersion factor, always present in the use of metallic seals, either force-fitted or soldered into the nozzles of multiple nozzle rockets, is substantially obviated.

It is considered that the invention relates to the novel construction of designs of the nozzle closures disclosed herein and to their relationships with jet motor nozzles. A wide variety of known plastic and thermoplastic materials are available for use in molding the closures and for use as bonding agents in attaching the closures in the motor nozzles. In actual practice, however, it is necessary to select materials for compatability with the propellant used in the rocket motor and to meet the storage and climatic conditions which a particular rocket is intended to be able to withstand. Thus, if rockets were to be fired almost immediately after assembly, at ambient sea level temperatures practically any known thermoplastic material could be used to form the nozzle closures and any of a wide variety of bonding and sealing materials could be used. Conversely, if it is desired to provide a rocket of long shelf or storage life and adapted to withstand extreme temperature variations, a proper selection of known materials must be made. Long shelf life is dependent upon a permanent seal (by the nozzle closure and sealing bond) and such a seal is possible only if the closure itself is not deteriorated by the gases exuded by the propellant material and if the sealant bonding material and closure are capable of retaining their flexibility at wide temperature ranges to preserve the closure bond and weather-seal under varying conditions. Obviously, many suitable materials are available and their selection is dependent upon the nature of the propellant and the degree of temperature variation a given rocket is expected to be able to withstand without deterioration. As an example, for most applications in this art, ethyl cellulose, which is comparatively inert, has been found particularly suitable as a thermoplastic material from which closures according to this invention may be made and by virtue of the provision of thickened portions 6, this material is suitably flexible at low temperatures.

As pointed out above, many materials are available for use as sealant bonding materials depending on the conditions intended to be encountered. One example of a particularly suitable group of materials is found in the polysulfide types of synthetic rubber which have come to be known as "Thiokol" and of which there are several varieties. In this group of materials, polysulfide liquid polymers are available which are capable of retaining flexibility at low temperatures (having a useful temperature range of —65 to 350° F.) and which have suitable solvent resistance properties. Such polysulfide liquid polymers are available at molecular weights of 300, 1000 and 4000, and are produced by reaction of a mixture of 98 mol percent of di(chloroethyl) formal and 2 mol percent of 1,2,3-trichloropropane with sodium polysulfide. Such materials and further details on their mode of manufacture are described in volume 11 of the Encyclopedia of Chemical Technology, edited by Kirk and Othmer (published 1953) on pages 842 and 843 thereof, and are given as examples of one group of eminently suitable sealant bonding material.

From the above, it may be readily seen that this invention provides rocket motor constructions including new and improved nozzle closure means of such a nature as to provide less dispersion in rocket flight characteristics and which are much less apt than prior art closure means to cause injury to personnel and equipment.

Obviously, many modifications and variations of the present invention are possible in the light of the above teachings. It is therefore to be understood that the scope of the invention is to be restricted only by the scope and limitations of the appended claims and not by the details of the illustrative examples specifically described hereinabove.

What is claimed is:
1. In a rocket motor of the type having an end member adapted to seal the after end of a rocket motor tube, said end member having a converging-diverging exhaust nozzle extending therethrough, said nozzle having an entrance portion of a shape formed by an inwardly convex curve of revolution, a throat portion rearwardly thereof, and a diverging fustro-conical portion rearwardly of the throat portion, the improvements in combination, comprising; means for sealing said nozzle against the atmosphere whereby the rocket motor may be stored for long periods without critical deterioration of its combustible contents, said last mentioned means comprising a closure member for said nozzle, said closure being of thermoplastic material and comprising a generally axial skirt of a size and shape to snugly fit a portion of the wall of the nozzle, said axial skirt terminating in a transverse frangible wall, said transverse wall comprising a thickened central button connected by a thinned outer portion to said axial skirt, said axial skirt being bonded and sealed to said nozzle wall by a suitable bonding and sealing material.

2. A rocket motor according to claim 1, in which said axial skirt of said closure is of a configuration to fit the entrance portion of the nozzle whereby the closure must be inserted prior to assembly of the rocket, and in which said closure is positioned with said transverse wall rearwardly in greatest proximity to said throat.

3. A rocket motor according to claim 1, in which said axial skirt of said closure is of a configuration to fit the exit portion of the nozzle whereby the closure may be externally inserted after assembly of the rocket, and in which said closure is positioned with said transverse wall forwardly in greatest proximity to said throat.

4. A rocket motor according to claim 1 in which the transverse wall of each said closure is of dished configuration whereby the radial flexibility of the closure construction is enhanced.

5. A rocket motor according to claim 1, in which said closure is further characterized in that an electrical conductor is supported in said transverse wall in a position to pass axially therethrough whereby electrical current may be passed through the sealed closure to initiate rocket motor operation.

6. A rocket motor according to claim 5, further characterized in that said electrical conductor is transversely knurled whereby motion relative to the transverse wall subsequent to assembly is inhibited.

7. A rocket motor according to claim 1, wherein the thermoplastic material of which said closures is formed is ethyl cellulose.

8. A rocket motor according to claim 1, wherein the bonding material is a polysulfide liquid polymer.

References Cited in the file of this patent
UNITED STATES PATENTS

| | | |
|---|---|---|
| 2,307,369 | Ferrel | Jan. 5, 1943 |
| 2,370,870 | McKeague | Mar. 6 1945 |
| 2,431,951 | Mauerer | Dec. 2, 1947 |
| 2,492,835 | Bjork | Dec. 27, 1949 |
| 2,503,269 | Hickman | Apr. 11, 1950 |
| 2,605,607 | Hickman | Aug. 5, 1952 |
| 2,627,160 | MacDonald | Feb. 3, 1953 |
| 2,661,691 | Brandt | Dec. 8, 1953 |
| 2,720,749 | Beebe | Oct. 18, 1955 |

FOREIGN PATENTS

| | | |
|---|---|---|
| 993,831 | France | July 25, 1951 |
| 1,088,620 | France | Sept. 15, 1954 |